United States Patent
Ishikawa

(10) Patent No.: US 8,613,042 B2
(45) Date of Patent: Dec. 17, 2013

(54) ACCESS CONTROL LIST CONVERSION SYSTEM, AND METHOD AND PROGRAM THRERFOR

(75) Inventor: Takayuki Ishikawa, Toyko (JP)

(73) Assignee: NEC Corporation, Tokyo (JP)

( * ) Notice: Subject to any disclaimer, the term of this patent is extended or adjusted under 35 U.S.C. 154(b) by 64 days.

(21) Appl. No.: 13/255,150

(22) PCT Filed: Mar. 17, 2010

(86) PCT No.: PCT/JP2010/054526
§ 371 (c)(1), (2), (4) Date: Sep. 7, 2011

(87) PCT Pub. No.: WO2010/107057
PCT Pub. Date: Sep. 23, 2010

(65) Prior Publication Data
US 2011/0321123 A1  Dec. 29, 2011

(30) Foreign Application Priority Data
Mar. 19, 2009 (JP) .................. 2009-068002

(51) Int. Cl.
G06F 17/00 (2006.01)
(52) U.S. Cl.
USPC .......................................................... 726/1
(58) Field of Classification Search
USPC .......................................................... 726/1
See application file for complete search history.

(56) References Cited

U.S. PATENT DOCUMENTS 7,992,188 B2 * 8/2011 Ohta et al. ................... 726/1
8,321,667 B2 * 11/2012 Bradshaw et al. ........... 713/165
2005/0198151 A1 * 9/2005 Thorson ..................... 709/206
2007/0124489 A1 * 5/2007 Swander et al. ............ 709/230
2008/0126287 A1 * 5/2008 Cox et al. .................... 706/48
2008/0313712 A1 * 12/2008 Ellison et al. ................ 726/4
2009/0013401 A1 * 1/2009 Subramanian et al. ...... 726/17

FOREIGN PATENT DOCUMENTS

| JP | 11-313102 A | 11/1999 |
|---|---|---|
| JP | 2004303243 A | 10/2004 |
| JP | 2005182478 A | 7/2005 |

(Continued)

OTHER PUBLICATIONS

International Search Report for PCT/JP2010/054526 mailed Apr. 20, 2010.

Primary Examiner — Kambiz Zand
Assistant Examiner — Abiy Getachew

(57) ABSTRACT

An access control list conversion system includes: a first rule judgment unit 12 that judges whether an access control rule is a permission rule or a prohibition rule; a temporary storage unit 15 that stores the access control rule which is judged to be the permission rule; a second rule judgment unit 13 that judges whether the actor user of the prohibition rule is the same as the actor user of the permission rule and whether the access target resource of the prohibition rule includes the access target resource of the permission rule; a resource DB that stores resource information in which all of the latest information of the access target resource is systematically recorded; and a resource expansion unit that removes the access target resource of the permission rule from the access target resource of the access control rule which is judged to have the actor user as that of the permission rule and to include the access target resource of the access control rule, with reference to the resource information.

24 Claims, 18 Drawing Sheets

(56) References Cited

FOREIGN PATENT DOCUMENTS

| | | | |
|---|---|---|---|
| JP | 2007087232 A | 4/2007 |
| JP | 2007316952 A | 12/2007 |
| JP | 2008219419 A | 9/2008 |
| JP | 2008234263 A | 10/2008 |
| WO | 2008/057716 A1 | 5/2008 |

* cited by examiner

FIG.6

```
yamada:var/samba/pub/**:read+,write+,execute-
yamada:var/samba/keiri/**:read+,write+,execute-
yamada:var/samba/**:read-,write-,execute-
```

FIG.8

```
yamada:var/samba/pub/**:read+,write+,execute-
yamada:var/samba/keiri/**:read+,write+,execute-
yamada:var/samba/soumu/**:read-,write-,execute-
yamada:var/samba/*:read-,write-,execute-
```

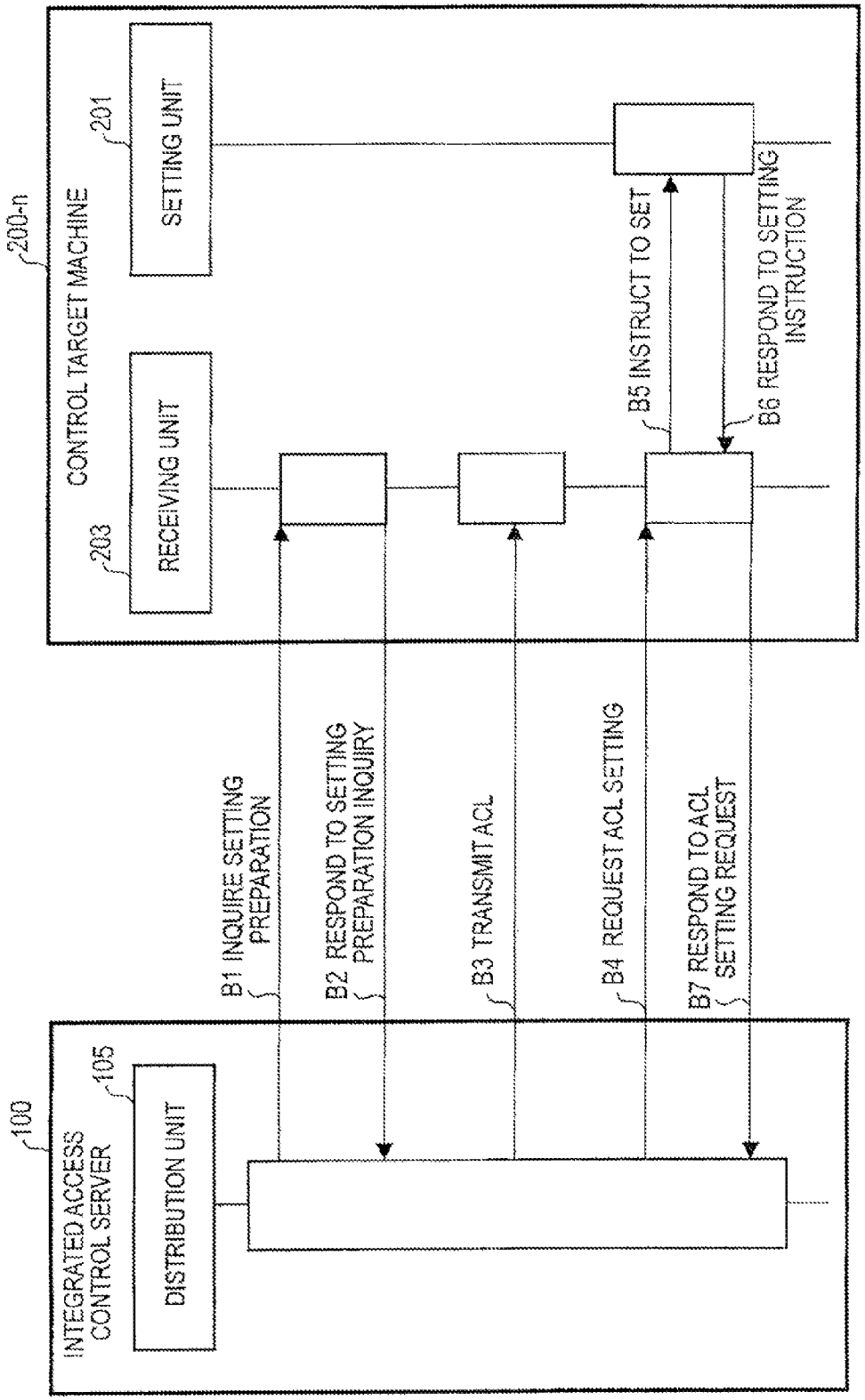

FIG.10

```
<env:Envelope
    xmlns:env="http://www.w3.org/2003/05/soap-envelope"
    xmlns:wsa="http://schemas.xmlsoap.org/ws/2004/08/addressing"
    xmlns:wse="http://schemas.xmlsoap.org/ws/2004/08/eventing"
    xmlns:wsen="http://schemas.xmlsoap.org/ws/2004/09/enumeration"
    xmlns:wsman="http://schemas.dmtf.org/wbem/wsman/1/wsman.xsd"
    xmlns:wsmeta="http://schemas.dmtf.org/wbem/wsman/1/wsman/version1.0.0.a/default-addressing-model.xsd"
    xmlns:wxf="http://schemas.xmlsoap.org/ws/2004/09/transfer"
    xmlns:xs="http://www.w3.org/2001/XMLSchema">
<env:Header>
<wsa:To env:mustUnderstand="true">Target_Address</wsa:To>
<wsa:ReplyTo>
<wsa:Address env:mustUnderstand="true">
    http://schemas.xmlsoap.org/ws/2004/08/addressing/role/anonymous
</wsa:Address>
<wsa:Action env:mustUnderstand="true">
    http://schemas.xmlsoap.org/ws/2004/09/transfer/Get
</wsa:Action>
<wsman:ResourceURI>ResourceURI</wsman:ResourceURI>
<wsa:MessageID env:mustUnderstand="true">Message_Id</wsa:MessageID>
<wsman:SelectorSet>
<wsman:Selector Name="PolicyID">Policy_Id</wsman:Selector>
</wsman:SelectorSet>
</env:Header>
<env:Body/>
</env:Envelope>
```

FIG. 11

```
<env:Envelope
    xmlns:env="http://www.w3.org/2003/05/soap-envelope"
    xmlns:wsa="http://schemas.xmlsoap.org/ws/2004/08/addressing"
    xmlns:wse="http://schemas.xmlsoap.org/ws/2004/08/eventing"
    xmlns:wsen="http://schemas.xmlsoap.org/ws/2004/09/enumeration"
    xmlns:wsman="http://schemas.dmtf.org/wbem/wsman/1/wsman.xsd"
    xmlns:wsmeta="http://schemas.dmtf.org/wbem/wsman/1/wsman/version1.0.0.a/default-addressing-model.xsd"
    xmlns:wxf="http://schemas.xmlsoap.org/ws/2004/09/transfer"
    xmlns:xs="http://www.w3.org/2001/XMLSchema">
<env:Header>
<wsa:To env:mustUnderstand="true">Target_Address</wsa:To>
<wsa:ReplyTo>
<wsa:Address env:mustUnderstand="true">
    http://schemas.xmlsoap.org/ws/2004/08/addressing/role/anonymous
</wsa:Address>
</wsa:ReplyTo>
<wsa:RelatesTo>Authentication_Id</wsa:RelatesTo>
<wsa:Action env:mustUnderstand="true">
    http://schemas.xmlsoap.org/ws/2004/09/transfer/Put
</wsa:Action>
<wsman:ResourceURI>Resource URI</wsman:ResourceURI>
<wsa:MessageID env:mustUnderstand="true">Message_Id</wsa:MessageID>
<wsman:SelectorSet>
<wsman:Selector Name="PolicyID">Policy_Id</wsman:Selector>
</wsman:SelectorSet>
</env:Header>
<env:Body>
<ns:policyInformation>
<ns:id>Policy_Id</ns:id>
<ns:path>PolicyFilePath</ns:path>
</ns:policyInformation>
</env:Body>
</env:Envelope>
```

FIG.14

```
yamada:var/samba/pub/**:read+,write+,execute-
yamada:var/samba/keiri/**:read-,write-,execute-
yamada:var/samba/soumu/**:read+,write+,execute-
yamada:var/samba/*:read-,write-,execute-
```

FIG.15

```
yamada:var/samba/keiri/**:read+,write+,execute-
yamada:var/samba/soumu/**:read-,write-,execute-
```

FIG.16

```
yamada:var/samba/keiri/**:read-,write-,execute-
yamada:var/samba/soumu/**:read+,write+,execute-
```

FIG.17

```
<env:Envelope
  xmlns:env="http://www.w3.org/2003/05/soap-envelope"
  xmlns:wsa="http://schemas.xmlsoap.org/ws/2004/08/addressing"
  xmlns:wse="http://schemas.xmlsoap.org/ws/2004/08/eventing"
  xmlns:wsen="http://schemas.xmlsoap.org/ws/2004/09/enumeration"
  xmlns:wsman="http://schemas.dmtf.org/wbem/wsman/1/wsman.xsd"
  xmlns:wsmeta="http://schemas.dmtf.org/wbem/wsman/1/wsman/Version1.0.0.a/default-addressing-model.xsd"
  xmlns:wxf="http://schemas.xmlsoap.org/ws/2004/09/transfer"
  xmlns:xs="http://www.w3.org/2001/XMLSchema">
<env:Header>
<wsa:To env:mustUnderstand="true"> Target_Address</wsa:To>
<wsa:ReplyTo>
<wsa:Address env:mustUnderstand="true">
http://schemas.xmlsoap.org/ws/2004/08/addressing/role/anonymous
</wsa:Address>
<wsa:Action env:mustUnderstand="true">
http://schemas.xmlsoap.org/ws/2004/09/Enumeration/Enumerate
</wsa:Action>
<wsman:ResourceURI>ResourceURI</wsman:ResourceURI>
<wsa:MessageID env:mustUnderstand="true">Message_Id</wsa:MessageID>
</env:Header>
<env:Body/>
</env:Envelope>
```

FIG.18

```
<env:Envelope
  xmlns:env="http://www.w3.org/2003/05/soap-envelope"
  xmlns:wsa="http://schemas.xmlsoap.org/ws/2004/08/addressing"
  xmlns:wse="http://schemas.xmlsoap.org/ws/2004/08/eventing"
  xmlns:wsen="http://schemas.xmlsoap.org/ws/2004/09/enumeration"
  xmlns:wsman="http://schemas.dmtf.org/wbem/wsman/1/wsman.xsd"
  xmlns:wsmeta="http://schemas.dmtf.org/wbem/wsman/1/wsman/version1.0.0.a/defau
lt-addressing-model.xsd"
  xmlns:wxf="http://schemas.xmlsoap.org/ws/2004/09/transfer"
  xmlns:xs="http://www.w3.org/2001/XMLSchema">
<env:Header>
<wsa:To env:mustUnderstand="true">Target_Address</wsa:To>
<wsa:ReplyTo>
<wsa:Address env:mustUnderstand="true">
  http://schemas.xmlsoap.org/ws/2004/08/addressing/role/anonymous
</wsa:Address>
<wsa:Action env:mustUnderstand="true">
  http://schemas.xmlsoap.org/ws/2004/09/transfer/Get
</wsa:Action>
<wsman:ResourceID>ResourceURI</wsman:ResourceURI>
<wsa:MessageID env:mustUnderstand="true">Message_Id</wsa:MessageID>
<wsman:SelectorSet>
<wsman:Selector Name="PolicyInstance">Policy_Instance</wsman:Selector>
</wsman:SelectorSet>
</env:Header>
<env:Body/>
</env:Envelope>
```

ACCESS CONTROL LIST CONVERSION SYSTEM, AND METHOD AND PROGRAM THRERFOR

TECHNICAL FIELD

The present invention relates to an access control list conversion system, an access control list conversion method, and an access control list conversion program that generate an access control list without restriction in a description order.

BACKGROUND ART

In regard to the distribution of a policy represented as an access control list, it is increasingly common that one integrated access control server performs access control on a plurality of control target machines.

Therefore, when the policy is changed, the access control list needs to be corrected and thus there is a demand for improvement on the maintainability of the access control list.

In general, the access control list is configured so as to include one or more access control rules, each including a set of an access target resource which is a target to be accessed, an accessing actor user who accesses the access target resource, and an access right that defines whether to permit or prohibit the access of the accessing actor user to the access target resource.

In an access control mechanism that performs access control using the access control list, the interpretation of the access control list varies depending on the order in which the access control rules are described in the access control list. Therefore, even when the access control rules have the same content, the control content of the entire access control list varies depending on the description order. In the access control mechanism, it is not ensured that the access control list is interpreted in a way that the person who changes the access control list intends.

The access control lists having the same access control content need to be made for each access control mechanism according to the interpretation characteristics of the access control mechanism, which impairs maintainability.

Patent Literature 1 discloses a technique that automatically gives an identification symbol and is capable of automatically detecting a contradictory rule and a redundant rule and extracting a contradictory portion from an ACL using a predetermined expression on the basis of the given identification symbol.

CITATION LIST

Patent Literature

{PLT 1} JP-A-2005-182478

SUMMARY OF INVENTION

Technical Problem

However, the invention disclosed in Patent Literature 1 can check the ACL so that two rules in the ACL are not contradictory to each other, but has a problem of incurring the huge cost in correction of the access control list when the access control policy is changed.

The reason is as follows. In the access control list, the description order of the access control rules is important and the interpretation of the access control list varies depending on the description order. Therefore, when the access control list is changed, the description order of the access control rules as well as the addition or deletion of the access control rules need to be considered.

In general, the access control list includes a plurality of access control rules each of which is a set of an accessing actor user, an access target resource, and an access right to permit or prohibit access. When the rules conflict to each other in control contents, the interpretation of the access control list varies depending on the description orders of the rules in a general access control mechanism. Even when the rules in the access control list have the same control content, the control content of every access control list varies depending on the description order of the rules. Therefore, it is not necessarily ensured that the access control list is interpreted in a way that the person who changes the access control list intends in the access control mechanism.

For example, with respect to an access control list in which "(rule 1) an arbitrary user must not read and write a file under a directory /etc." is described, when rule 2 such as "(rule 2) a user "Yamada" may change a file /etc/passwd." is added after the rule 1 in order to give a right to the user "Yamada", the access control mechanism prohibits the user "Yamada" from changing the file /etc/passwd. The reason is that the access control mechanism has the interpretation characteristics that it preferentially processes a condition which is satisfied firstly and the rule 1 is satisfied firstly to the access request. In order to exactly reflect the right, at least the rule 2 needs to be described more preferentially than the rule 1.

As such, the characteristics that the operation of the access control mechanism varies depending on the description order of the access control rules make it difficult to appropriately change the access control list, as well as to verify that which user can access which resource under the current access control list or which user cannot.

The problem caused by a change in the access control list becomes more serious as the number of rules in the access control list increases, and it was a cause of deficiency in the setting of an access right.

A second problem is that the access control list needs to be generated for each access control mechanism.

The reason is as follows. When the access control is executed by a plurality of various access control mechanisms, it is necessary to generate the access control policies with the same access control content for each of the access control mechanisms having different characteristics, such as a characteristic in which the access control rules are processed in descending order, from the access control rule described on top of the access control list and another characteristic in the access control rules are processed in an arbitrary order. In the present circumstances in which a plurality of various access control target machines are present, when a new access control policy is established or when the existing access control policy is changed, the access control list needs to be generated or corrected according to each of the characteristics of the access control mechanisms.

For such a reason, an exemplary objective of the invention is to provide an access control list conversion system, an access control list conversion method, and an access control list conversion program that generate an access control list without restriction in description order.

Solution to Problem

According to a first exemplary aspect of the invention, there is provided an access control list conversion system including: a reading unit that is supplied with an access control list including at least one access control rule, which is a set of an access target resource to be accessed, an accessing actor user who accesses the access target-resource, and an access right that defines whether to permit or prohibit the access of the accessing actor user to the access target resource, and reads the access control rule described in the access control list; a first rule judgment (determining) unit that judges whether the read access control rule is a permission rule which permits the access of the accessing actor user to the access target resource or a prohibition rule which prohibits the access of the accessing actor user to the access target resource; a storage unit that stores the access control rule which is judged to be the permission rule by the first rule judgment unit; a second rule judgment (determining) unit that judges whether the accessing actor user of the access control rule which is judged to be the prohibition rule is the same as the accessing actor user of the access control rule stored in the storage unit and whether the access target resource of the access control rule which is judged to be the prohibition rule includes the access target resource of the access control rule stored in the storage unit; a database that stores resource information in which all of the latest information of the access target resource is systematically recorded from a superordinate concept to a subordinate concept; and a resource expansion unit that removes, with reference to the resource information, the access target resource described in the access control rule which is stored in the storage unit from the access target resource of the access control rule which is judged by the second rule judgment unit to have the same accessing actor user as that of the access control rule stored in the storage unit and to include the access target resource of the access control rule stored in the storage unit.

According to the first exemplary aspect of the invention, there is provided an access control list conversion method including: a first rule judging step of receiving an access control list including at least one access control rule, which is a set of an access target resource to be accessed, an accessing actor user who accesses the access target resource, and an access right that defines whether to permit or prohibit the access of the accessing actor user to the access target resource, reading the access control rule described in the access control list, and judging whether the read access control rule is a permission rule which permits the access of the accessing actor user to the access target resource or a prohibition rule which prohibits the access of the accessing actor user to the access target resource; a storage step of storing the access control rule which is judged to be the permission rule in the first rule judging step; a second rule judging step of judging whether the accessing actor user of the access control rule which is judged to be the prohibition rule is the same as the accessing actor user of the access control rule stored in the storage step and whether the access target resource of the access control rule which is judged to be the prohibition rule includes the access target resource of the access control rule stored in the storage step; and a resource expansion step of storing resource information in which all of the latest information of the access target resource is systematically recorded from a superordinate concept to a subordinate concept in a database, and removing, with reference to the resource information, the access target resource described in the access control rule which is stored in the storage step from the access target resource of the access control rule which is judged in the second rule judging step to have the same accessing actor user as that of the access control rule stored in the storage step and to include the access target resource of the access control rule stored in the storage step.

Further, according to the first exemplary aspect of the invention, there is provided an access control list conversion program that allows a computer to perform: processing of receiving an access control list including at least one access control rule, which is a set of an access target resource to be accessed, an accessing actor user who accesses the access target resource, and an access right that defines whether to permit or prohibit the access of the accessing actor user to the access target resource; reading processing of reading the access control rule described in the access control list; first rule judging processing of judging whether the read access control rule is a permission rule which permits the access of the accessing actor user to the access target resource or a prohibition rule which prohibits the access of the accessing actor user to the access target resource; storage processing of storing the access control rule which is judged to be the permission rule in the first rule judging processing; second rule judging processing of judging whether the accessing actor user of the access control rule which is judged to be the prohibition rule is the same as the accessing actor user of the access control rule stored in the storage processing and whether the access target resource of the access control rule which is judged to be the prohibition rule includes the access target resource of the access control rule stored in the storage processing; a processing of storing resource information in which all of the latest information of the access target resource is systematically recorded from a superordinate concept to a subordinate concept in a database; and resource expansion processing of removing, with reference to the resource information, the access target resource described in the access control rule which is stored in the storage processing from the access target resource of the access control rule which is judged in the second rule judging processing to have the same accessing actor user as that of the access control rule stored in the storage processing and to include the access target resource of the access control rule stored in the storage processing.

Advantageous Effects of Invention

According to the access control list conversion system, the access control list conversion method, and the access control list conversion program of the exemplary embodiments of the invention that generate an access control list, the access target resource included in the already-existing permission rule is eliminated from a new prohibition rule that has containment relationship with the already-existing permission rule. In this way, it is possible to provide an access control list conversion system, an access control list conversion method, and an access control list conversion program that generate an access control list without restriction in description order.

BRIEF DESCRIPTION OF DRAWINGS

FIG. 6 is a diagram illustrating a typical top-priority access control list.

FIG. 8 shows an access control list in which there is no restriction in the description order of converted access control rules.

FIG. 9 shows a policy distribution/setting protocol.

FIG. 10 shows a policy setting preparation inquiry message based on SOAP.

FIG. 11 shows a policy setting instruction message based on SOAP.

FIG. 14 shows an access control list after a policy is changed.

FIG. 15 shows an added access control list in difference distribution.

FIG. 16 shows a deleted access control list in difference distribution.

FIG. 17 shows an ACL enumeration request message based on SOAP.

FIG. 18 shows an ACL acquisition request message based on SOAP.

DESCRIPTION OF EMBODIMENTS

Hereinafter, exemplary embodiments of the invention will be described in detail with reference to the accompanying drawings.

First Embodiment

Figure 1:
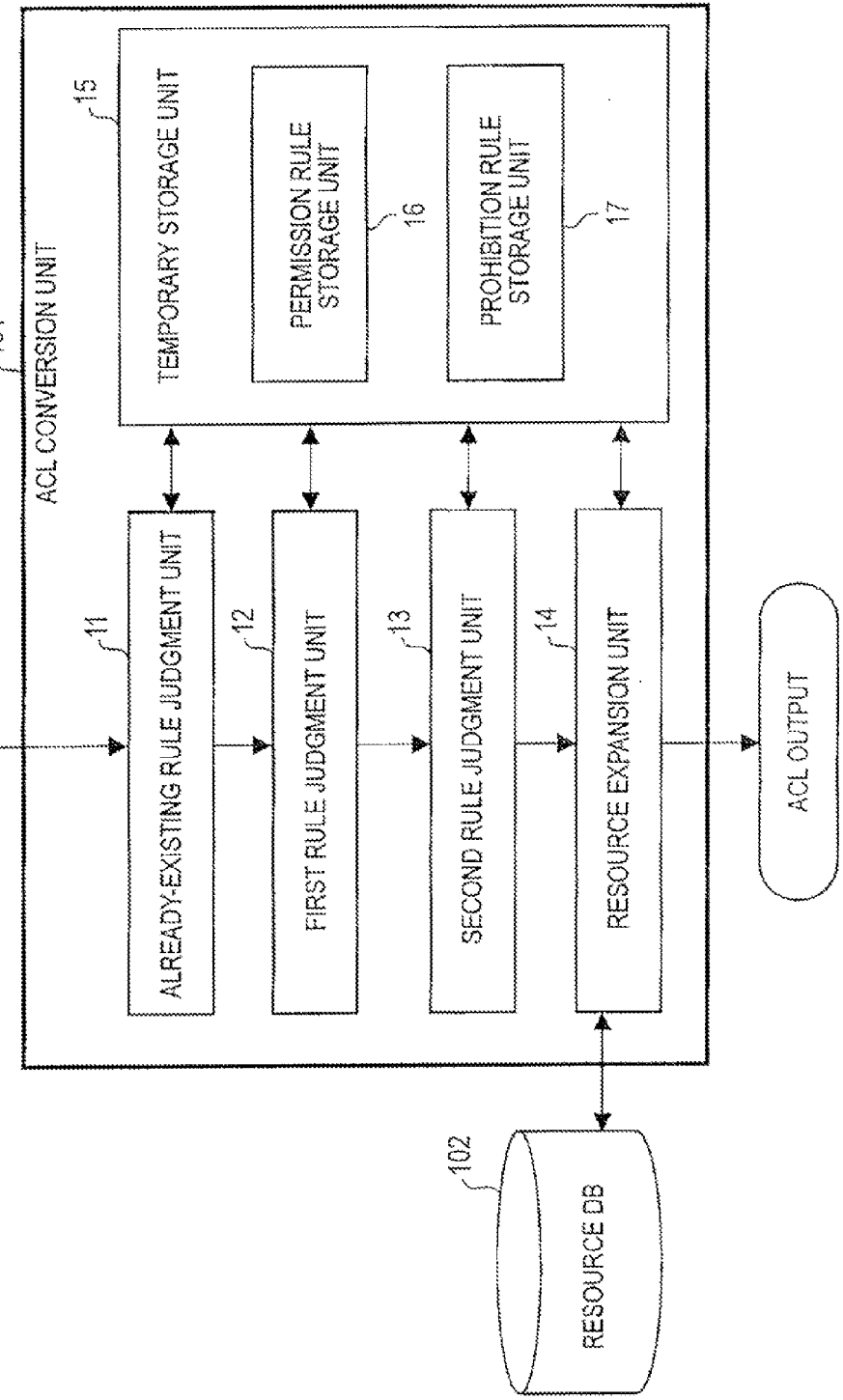
FIG. 1 is a block diagram illustrating an example of the structure of an access control list generation/conversion system according to a first embodiment of the invention.

FIG. 1 is a block diagram illustrating an example of the structure of an access control list generation/conversion system according to a first embodiment of the invention.

Referring to FIG. 1, the first embodiment of the invention includes an ACL conversion unit 101 and a resource DB 102.

The resource DB 102 systematically stores all of the latest information of resources to be controlled by an access control list (ACL), from a superordinate concept to a subordinate concept.

In the invention, the access control list is configured so as to include one or more access control rules each of which is a set of an access target resource to be accessed, an accessing actor user who accesses the access target resource, and an access right that defines whether to permit or prohibit the access of the accessing actor user to the access target resource. The "accessing actor user" is, for example, information capable of specifying the user who accesses resources, such as "Yamada". The "accessing actor user" may be a name for identifying the user or a code for identifying the user.

The access target resource is represented by a set or an element. Symbol "*" is a set notation representing "directly under" and symbol "**" is a set notation representing "everything under".

The ACL conversion unit 101 includes an already-existing rule judgment (determining) unit 11, a first rule judgment (determining) unit 12, a second rule judgment (determining) unit 13, a resource expansion unit 14, and a temporary storage unit 15.

The temporary storage unit 15 includes a permission rule storage unit 16 that stores a permission rule for permitting the access of the accessing actor user to the access target resource and a prohibition rule storage unit 17 that stores a prohibition rule for prohibiting the access of the accessing actor user to the access target resource.

The already-existing rule judgment unit 11 is a reading unit that sequentially reads the access control rules one by one in the order described in the access control list. The already-existing rule judgment unit 11 judges whether the read new access control rule is included in the access control of the already-existing rule that is ranked above the read new access control rule in the access control list with reference to the temporary storage unit 15. When the new rule is included in the access control content of the already-existing rule, that is, when the read access control rule is the access control rule stored in the temporary storage unit 15, the already-existing rule judgment unit 11 reads a new access control rule from the access control list.

When the new rule is not included in the access control content of the already-existing rule, the first rule judgment unit 12 judges whether the rule is the permission rule or the prohibition rule. When the new rule is the permission rule, the rule is stored in the permission rule storage unit 16 and returns to the already-existing rule judgment unit 11.

When the new rule is the prohibition rule, the second rule judgment unit 13 judges whether the accessing actor user of the new rule is the same as the accessing actor user in the rule stored in the permission rule storage unit 16 and whether the access target resource is included in the access target resource of the rule, that is, whether the new rule is contrary to the rule stored in the permission rule storage unit 16 with reference to the temporary storage unit 15.

When the new rule is not contrary to the rule stored in the permission rule storage unit 16, that is, when the accessing actor user is different from that of the access control rule stored in the temporary storage unit 15 or when the access target resource of the rule does not include the access target resource of the access control rule stored in the temporary storage unit 15, the rule is stored in the prohibition rule storage unit 17 and returns to the already-existing rule judgment unit 11.

The resource expansion unit 14 extracts and expands the access target resource of the rule contrary to the rule stored in the permission rule storage unit 16 to the same level of subordinate concept as that of the access target resource stored in the permission rule storage unit 16 using the resource DB 102, rewrites the access control rule with the access target resources of the subordinate concept that does not overlap each other between the rules, and stores the access control rule in the prohibition rule storage unit 17. When the rule is not the last rule in the access control list, it returns to the already-existing rule judgment unit 11.

Operation of First Embodiment

Figure 2:
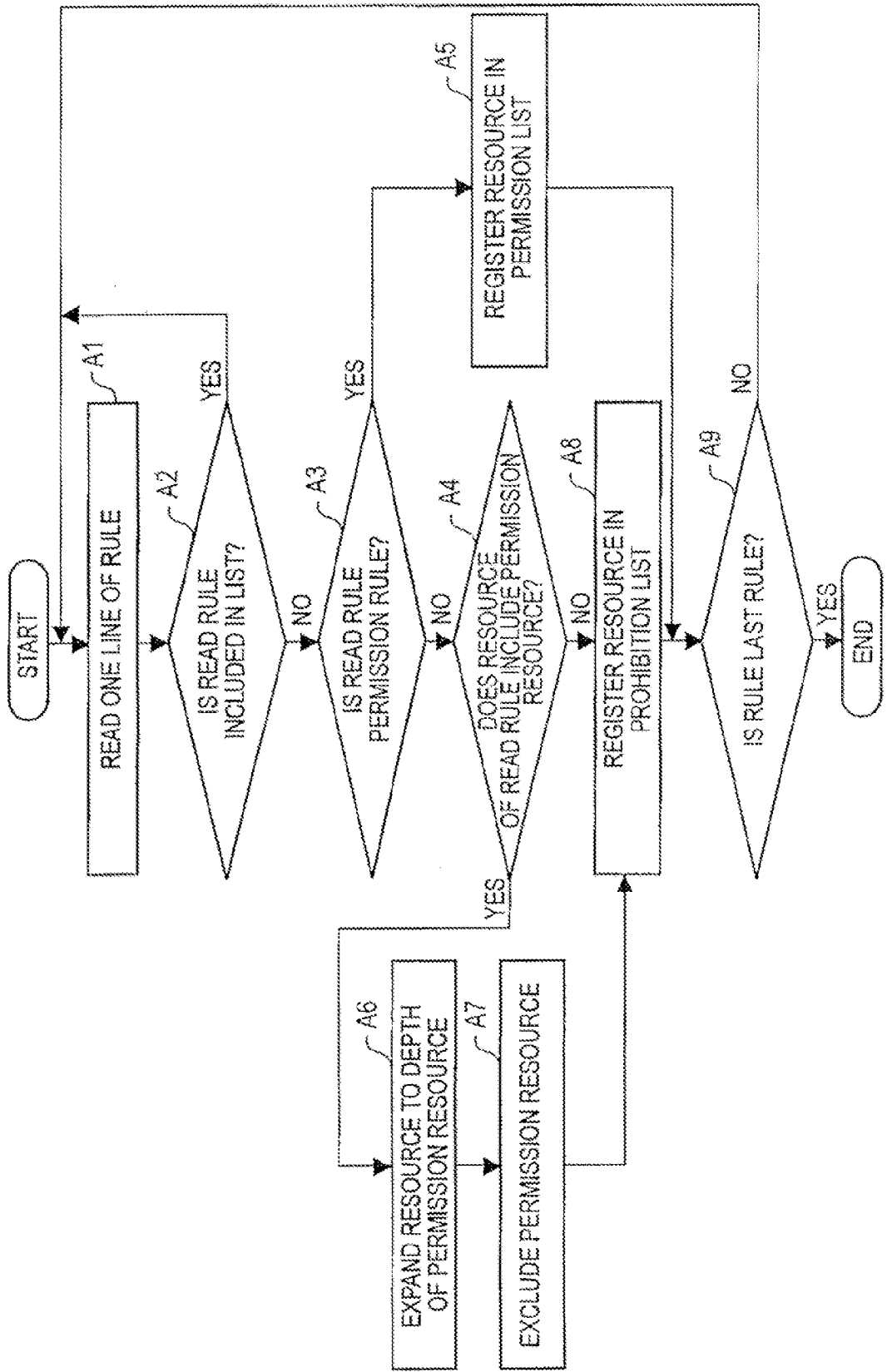
FIG. 2 is a flowchart illustrating an access control list generation/conversion algorithm according to the first embodiment of the invention.

Next, the operation of this embodiment will be described in detail with reference to FIGS. 1 and 2. FIG. 2 is a flowchart illustrating the access control list generation/conversion algorithm according to the first embodiment of the invention.

An input access control list is supplied to the already-existing rule judgment unit 11 shown in FIG. 1. The already-existing rule judgment unit 11 reads the access control rules one by one in the order described in the input access control list. In addition, the already-existing rule judgment unit 11 judges whether the read rule is included in the already-existing access control rule that is ranked above the read rule in the input access control list with reference to the rules stored in the temporary storage unit 15 (Steps A1 and A2 in FIG. 2).

When the read rule is not included in the rules stored in the temporary storage unit 15, the read rule is supplied to the first rule judgment unit 12. When the read rule is included in the rules stored in the temporary storage unit 15, the next access control rule in the input access control list is read and the same process as described above is performed again until the rule reaches the end of the access control list.

The inclusion of one rule in another rule means that the accessing actors and access rights to permit or prohibit access are the same in the two rules and the access target resource of the one rule is a subset of the access target resource of another rule including the one rule. Therefore, the "already-existing access control rule ranked higher" described above means that another rule including the one rule. That is, when one rule is included in another rule, the accessing actors and access rights to permit or prohibit access are the same in the two rules and the access target resource of the another rule includes that of the one rule, that is, the another rule is a superordinate concept of the one rule. The another rule has been stored in the temporary storage unit 15.

The first rule judgment unit 12 shown in FIG. 1 judges whether the read rule is the permission rule (Step A3 in FIG. 2). When the read rule is not the permission rule, that is, when the read rule is the prohibition rule, the rule is supplied to the second rule judgment unit 13. When the read rule is the permission rule, the rule is stored in the permission rule storage unit 16 (Step A5 in FIG. 2).

The second rule judgment unit 13 shown in FIG. 1 judges whether the accessing actor user described in the read rule is the same as the accessing actor user of the permission rule stored in the permission rule storage unit 16 and the access target resource described in the read rule includes the access target resource described in the permission rule which is stored in the permission rule storage unit 16 with reference to the temporary storage unit 15 (Step A4 in FIG. 2). When the access target resource described in the read rule does not include the access target resource described in the permission rule, the read rule is stored in the prohibition rule storage unit 17 without any change. When the access target resource described in the read rule includes the access target resource described in the permission rule, the rule is supplied to the resource expansion unit 14.

The resource expansion unit 14 shown in FIG. 1 expands the access target resource described in the read rule to a depth capable of representing a set or an element of the access target resource which is described in the permission rule stored in the permission rule storage unit 16 and is included in the read rule, that is, to the same level of subordinate concept as that of the access target resource of the access control rule stored in the permission rule storage unit 16 (Step A6 in FIG. 2). The resources having the same depth mean that the resources have the same hierarchy of expression and do not have the same subset.

The resource described in the permission rule is removed from the resource of the rule that is expanded to the same depth as that to which the resource described in the permission rule is expanded and then the rule is stored in the prohibition rule storage unit 17 (Steps A7 and A8 in FIG. 2).

As the last output, a rule group stored in the prohibition rule storage unit 17 is output as the access control list.

In this embodiment, a method for performing conversion into the access control list of a black list format in which there is no restriction in the description order is used. However, permission and prohibition may be exchanged to perform conversion into an access control list of the permission rules having a white list format in which there is no restriction in the description order.

In the black list format, access to the resource in which the default access control condition of an access control list to be generated is not described is permitted. In the white list format, access to the resource in which the default access control condition is not described is prohibited.

In the output in the white list format, the second rule judgment unit 13 judges whether the accessing actor user of the access control rule which is judged to be the permission rule by the first rule judgment unit 12 is the same as the accessing actor user of the access control rule, which is the prohibition rule stored in the temporary storage unit 15 and the access target resource of the access control rule which is judged to be the permission rule includes the access target resource of the access control rule, which is the prohibition rule stored in the temporary storage unit 15.

The temporary storage unit 15 also includes the prohibition rule storage unit 17 that stores the access control rule which is judged to be the prohibition rule by the first rule judgment unit 12 and the permission rule storage unit that stores the access control rule which is judged to be the permission rule by the first rule judgment unit 12, the access control rule which is judged by the second rule judgment unit 13 to have the same accessing actor user as that of the access control rule stored in the temporary storage unit 15 and not to include the access target resource of the access control rule stored in the temporary storage unit 15, and the access control rule from which the access target resource described in the access control rule which is stored in the temporary storage unit 15 is removed by the resource expansion unit 14 in the output of the white list format.

Second Embodiment

Next, an access control list difference distribution system according to another embodiment of the invention will be described in detail with reference to the drawings.

In this embodiment, an access control list (ACL) is comprehensively managed, the access control list is updated for an updated policy, and the difference between the access control lists before and after update is distributed to each control target machine.

Figure 3:
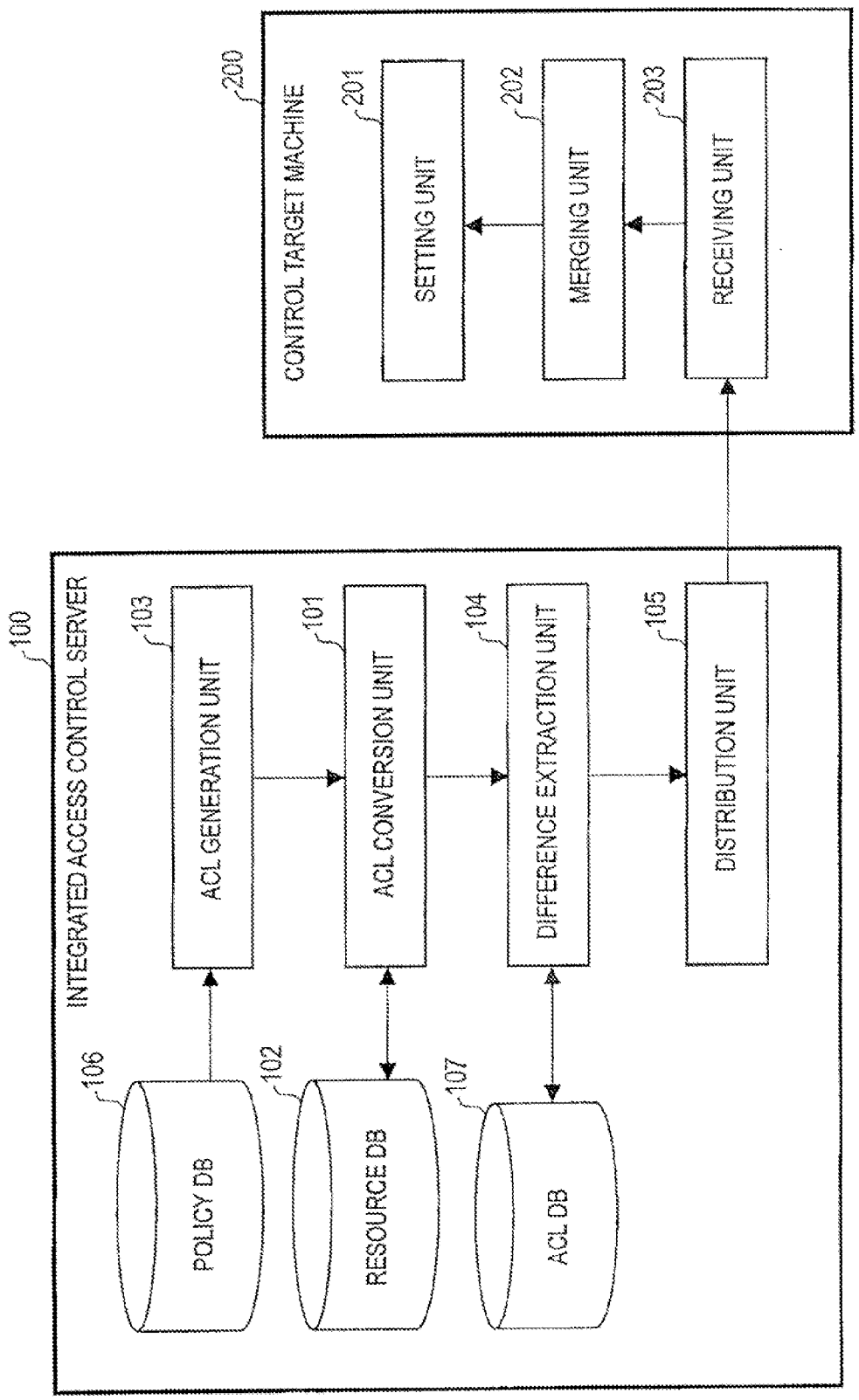
FIG. 3 is a block diagram illustrating an example of the structure of an access control list difference distribution system according to a second embodiment of the invention.

Referring to FIG. 3, this embodiment includes an integrated access control server 100 and a control target machine 200. FIG. 3 is a block diagram illustrating an example of the structure of the access control list difference distribution system according to a second embodiment of the invention.

The integrated access control server 100 includes a policy DB 106, a resource DB 102, an ACL DB 107, an ACL generation unit 103, an ACL conversion unit 101, a difference extraction unit 104, and a distribution unit 105. The policy DB 106 stores a policy having access control information described therein and the ACL DB 107 stores the previously generated and distributed ACL.

The control target machine 200 includes a setting unit 201, a merging unit 202, and a receiving unit 203.

In the integrated access control server 100, the policy DB 106 supplies a policy, which is the access control information of an updated distribution target, to the ACL generation unit 103. The ACL generation unit 103 generates an ACL in which access control rules, each being represented by (an accessing actor user, an access target resource, and a right to permit or prohibit access), are described in descending order of priority from the supplied policy. In this case, in the policy, the user who performs access control is described as the accessing actor user, the resource access to which is controlled is described as the access target resource, and an access right given to the user is described as the right to permit or prohibit access.

The generated ACL is supplied to the ACL conversion unit 101 and the ACL conversion unit 101 converts the received ACL into an ACL without restriction in the description order using the resource information of the resource DB 102. A process of generating the ACL without restriction in the description order using the resource DB 102 and the ACL conversion unit 101 is the same as that in the first embodiment shown in FIG. 1.

The difference extraction unit 104 compares the character strings of the access target resource and the right to permit or prohibit access in each of the access control rules including the same accessing actor user which is respectively described in the ACL without restriction in the order that is converted by the ACL conversion unit 101 and the ACL before update that is stored in the ACL DB 107, and extracts as difference information the access control rule that is described in the ACL before update, but is not described in the newly converted ACL, or the access control rule that is not described in the ACL before update, but is described in the newly converted ACL.

The difference information is composed of only a set of the access control rules that are not included in the ACL before update, but is included in the newly converted ACL or a set of the access control rules that are included in the ACL before update, but is not included in the newly converted ACL, and does not include description order information. The extracted difference information is supplied to the distribution unit 105 and is then distributed to the control target machine 200.

In the control target machine 200, the receiving unit 203 receives the difference information distributed by the distribution unit 105 of the integrated access control server 100 and supplies the received difference information to the merging unit 202. The merging unit 202 adds the added access control rule to the currently applied access control list before update on the basis of the difference information and removes the deleted access control rule therefrom to obtain an updated access control list. The merged access control list is supplied to the setting unit 201 and the setting unit 201 applies the access control list to the control target machine.

In this embodiment, as the difference information, only the added information and the deleted information of the access control rule can be distributed, thereby generating the updated access control list. Since information required for update does not have a restriction in order, it is possible to reduce the amount of communication between the integrated access control server and the control target machine. In addition, it is not necessary to reconstruct the access control list considering the description order. Therefore, it is possible to reduce the amount of resources used by the control target machine to update the access control list.

Third Embodiment

Next, an access control list consistency guarantee difference distribution system according to another embodiment of the invention will be described in detail with reference to the drawings.

Figure 4:
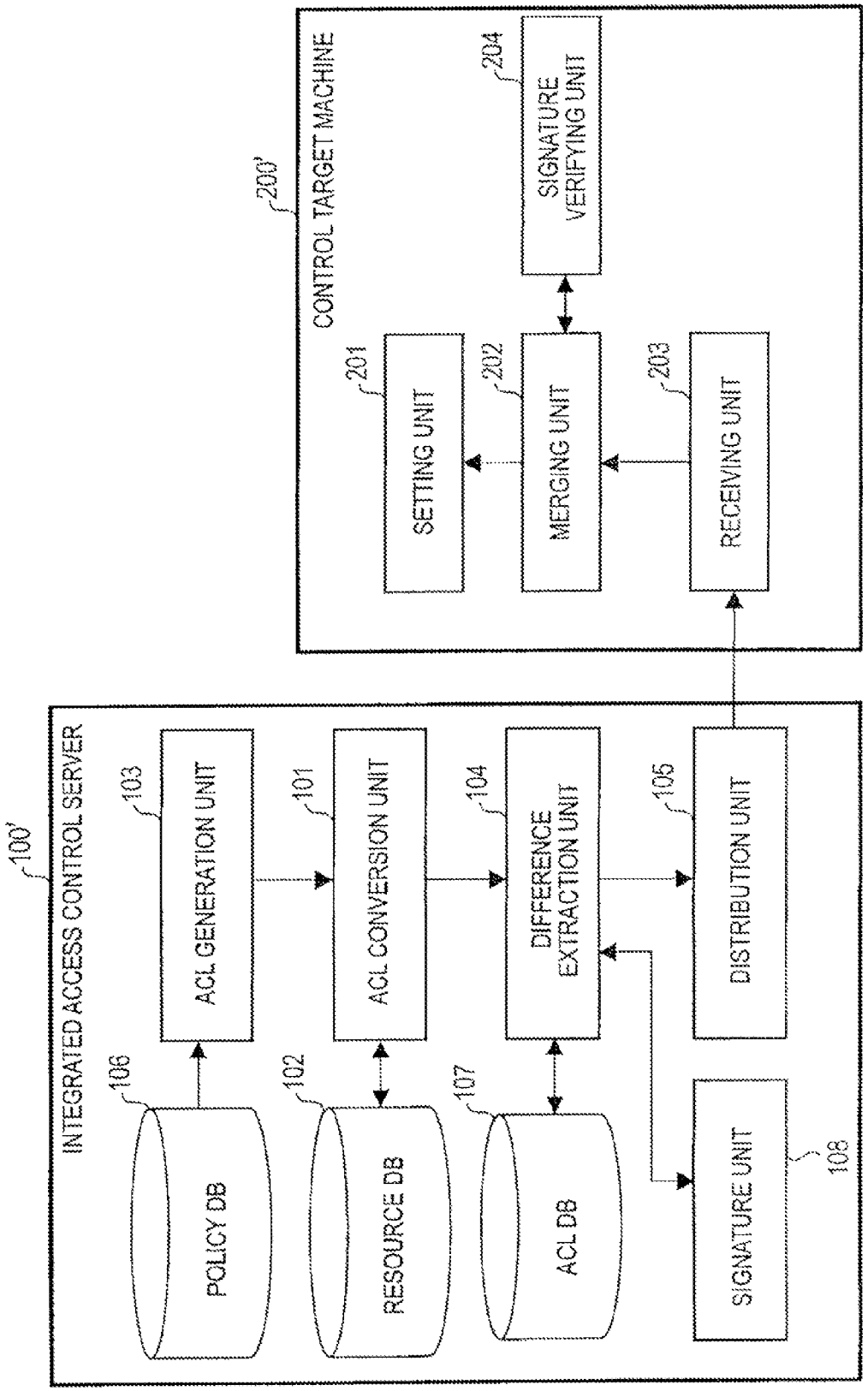
FIG. 4 is a block diagram illustrating an example of the structure of an access control list difference distribution consistency guarantee system according to a third embodiment of the invention.

In this embodiment, an example of consistency guarantee in the distribution of the difference between the access control lists is described. FIG. 4 is a block diagram illustrating an example of the structure of the access control list difference distribution consistency guarantee system according to a third embodiment of the invention.

Referring to FIG. 4, in this embodiment, an integrated access control server 100' further includes a signature unit 108 and a control target machine 200' further includes a signature verifying unit 204, as compared to the second embodiment.

In the integrated access control server 100', the difference information extracted by the difference extraction unit 104 is supplied to the signature unit 108. The signature unit 108 adds a digital signature to the supplied difference information with a secret key which is stored in the integrated access control server 100' and indicates a regular integrated access control server using a predetermined signature scheme, such as an RSA signature scheme.

The distribution unit 105 distributes the difference information of the access control list having the signature added thereto to the control target machine 200'.

In the control target machine 200', the receiving unit 203 receives the difference information having the signature added thereto and supplies the difference information to the merging unit 202. The merging unit 202 verifies the signature added to the supplied difference information with a public key that is stored in the control target machine and is issued by the regular integrated access control server, using the signature verifying unit 204.

When the validity of the difference information is guaranteed, the merging unit 202 adds the added access control rule to the currently applied access control list before update and removes the deleted access control rule therefrom. The merged access control list is applied to the control target machine by the setting unit 201.

In this embodiment, there is no restriction in the order in which the access control rules are described. Therefore, when the validity of the difference information, which is the information of a set of the access control rules, is guaranteed, the validity of an updated access control list obtained by merging the difference information with the access control list before update is guaranteed.

Fourth Embodiment

Next, a system in which an integrated access control server according to another embodiment of the invention has only a policy which is a source of an access control list, thereby performing access control will be described in detail with reference to the drawings.

Figure 12:
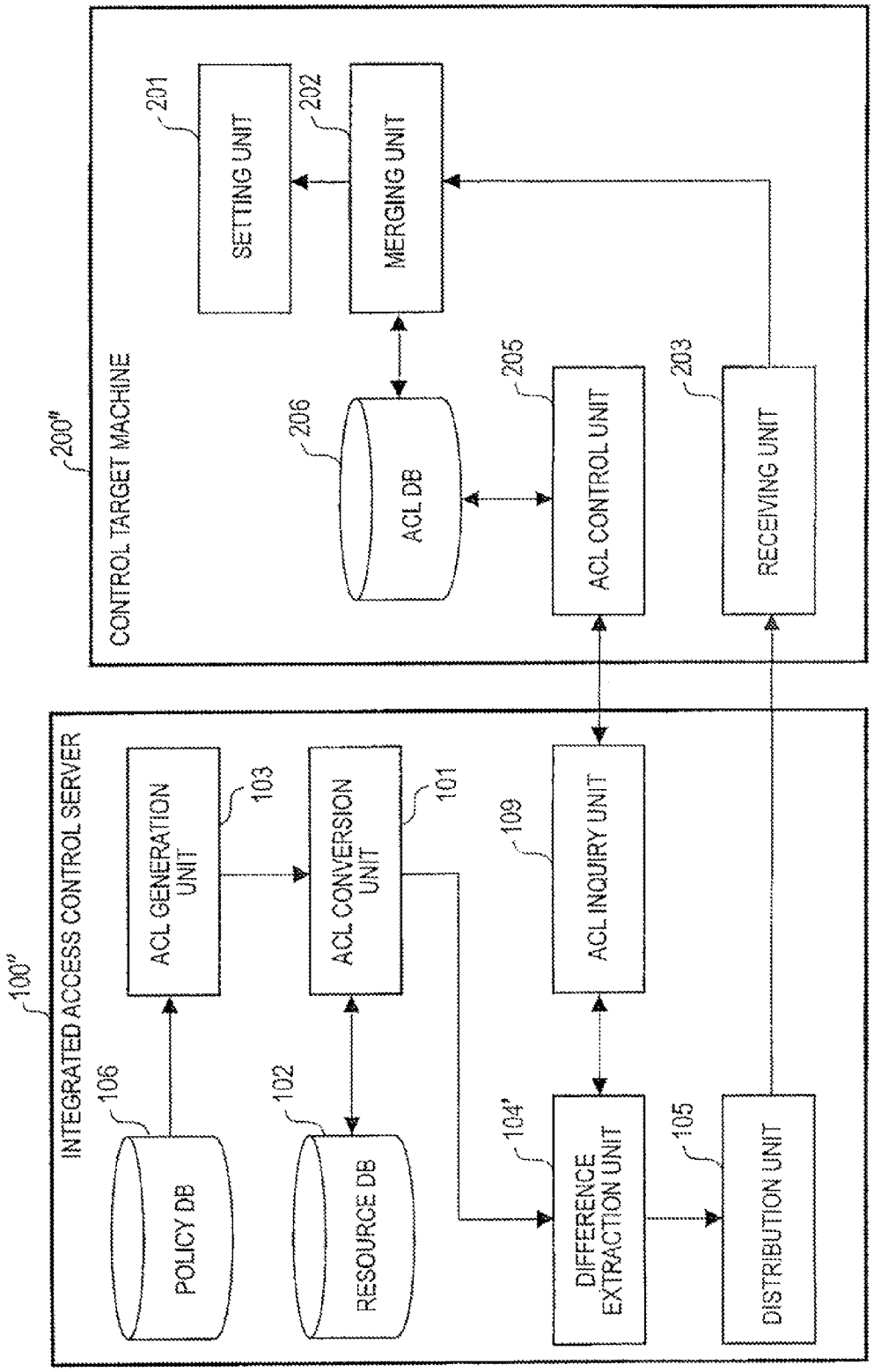
FIG. 12 is a block diagram illustrating an example of the structure of an access-control-list-reference-type access control list generation/conversion system according to a fourth embodiment of the invention.

In this embodiment, an example in which the integrated access control server manages only a common policy and performs access control without storing an access control list required for an access control mechanism on each control target machine is described. FIG. 12 is a block diagram illustrating an example of the structure of an access-control-list-reference-type access control list generation/conversion system according to a fourth embodiment of the invention.

Referring to FIG. 12, in this embodiment, the ACL DB 107 is not needed in the integrated access control server 100" and the integrated access control server 100" includes an ACL inquiry unit 109 and a difference extraction unit 104' having an information transmitting unit that transmits information to the ACL inquiry unit. A control target machine 200" further includes an ACL control unit 205 and an ACL DB 206.

The difference extraction unit 104' can inquire the currently set ACL of the control target machine 200" using the ACL inquiry unit 109 in order to obtain the difference information between the ACL obtained by the ACL conversion unit 101 of the integrated access control server 100" and the ACL set to the control target machine 200".

The ACL inquiry unit 109 inquires the currently set ACL or the distributed ACL of the ACL control unit 205 of the control target machine 200". Then, the ACL control unit 205 responds to the inquiry on the basis of the information stored in the ACLDB 204. The information obtained from the ACL control unit 205 by the ACL inquiry 109 is added to the currently set ACL. In this way, it is possible to obtain meta information of the ACL, such as the ID or revision of the ACL and the time when the ACL is set or distributed.

The exchange of the meta information makes it possible to reduce a transmission cost, as compared to the structure that transmits the ACL. For example, the meta information includes a hash value of the ACL and the hash value obtained by sorting the ACL without restriction in order is exchanged. In this way, it is possible to detect whether there is a difference between the ACL obtained by the ACL conversion unit and the currently set ACL and thus reduce the cost of extracting the difference.

In this embodiment, the integrated access control server does not need to store the ACL of each control target machine and may manage only a common policy for performing access control. Therefore, it is possible to reduce the management and operation costs of the integrated access control server. In addition, information required for the access control of the access control mechanism, such as information set to the control target machine, is used, which makes it possible for the integrated access control server to browse and use real-time access control information.

Fifth Embodiment

Figure 5:
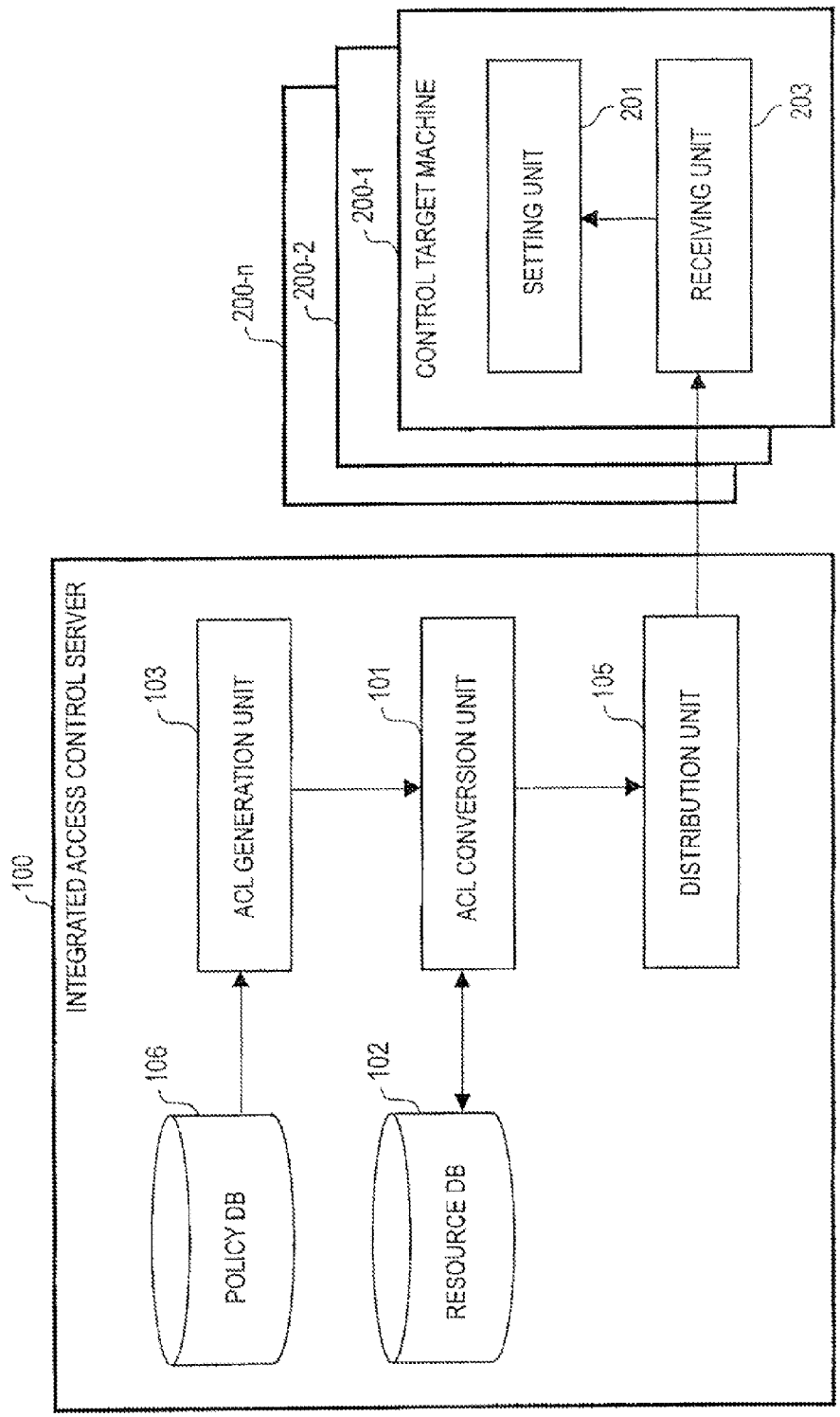
FIG. 5 is a block diagram illustrating an access control list generation/conversion/distribution system according to a fifth embodiment of the invention.

Next, an exemplary embodiment will be described in detail with reference to the drawings. FIG. 5 is a block diagram illustrating an access control list generation/conversion/distribution system according to a fifth embodiment of the invention.

In this embodiment, an access control list (ACL) is comprehensively managed, the access control list is generated from an established policy, and the access control list is distributed and set to each control target machine. Referring to FIG. 5, this embodiment includes an integrated access control server 100 and a plurality of (n) control target machines 200-$n$.

The integrated access control server 100 includes a policy DB 106, a resource DB 102, an ACL generation unit 103, an ACL conversion unit 101, and a distribution unit 105. Each of the control target machines 200-$n$ includes a setting unit 201 and a receiving unit 203.

In the integrated access control server 100, the policy DB 106 that stores an established policy supplies a policy to be distributed to the ACL generation unit 103 and obtains an ACL.

For example, the established policy is that Yamada of the accounting department is allowed read and write data under /var/samba/pub/, a directory shared also by a Web server, and data under /var/samba/keiri, a directory used exclusively by the accounting department, but is not allowed to read and write data in any other directories under /var/samba/. For the policy, the ACL generation unit 103 generates an ACL as shown in FIG. 6. In the ACL, in each access control rule, the actor who accesses "Yamada" of the accounting department described by the policy is described as Yamada, and /var/samba/pub/, /var/samba/keiri/, and /var/samba/** are described as the access target resources. In addition, a right to access each access target resource is represented by "write+" when writing is permitted, and the access right is represented by "write–" when writing is prohibited. That is, permission is represented by "+" and prohibition is represented by "–". In this way, writing, reading, and execution access rights are described in the access control rules. The access control rules are described in the policy in descending order of priority and are also described in the ACL in descending order of priority. For the notation of "*" and "**" in an access target list in the ACL, "*" indicates "directly under a directory" and "**" indicates "everything under a directory".

Figure 7:
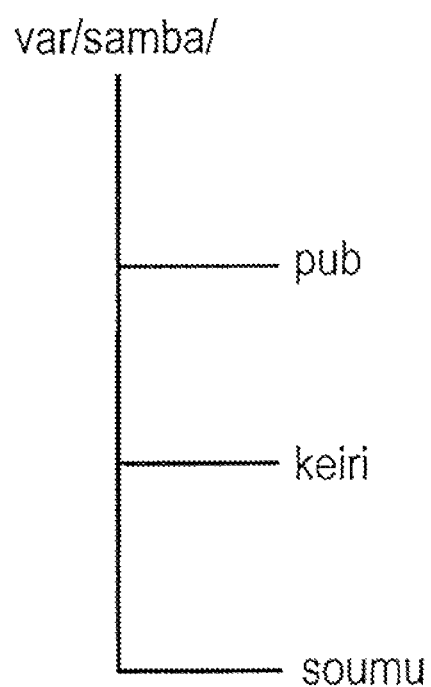
FIG. 7 is a diagram illustrating the structure of an access target resource.

The above-mentioned ACL is input to the ACL conversion unit 101. The ACL conversion unit 101 converts the above-mentioned ACL into an ACL that does not depend on the description order of the access control rules with reference to the resource DB 102 that stores the resource information of a control target machine and outputs the converted ACL. With regard to the above-mentioned ACL, when all of the resource information of the control target machine stored in the resource DB 102 is as shown in FIG. 7, a process of converting the ACL will be described in detail with reference to FIGS. 1 and 2.

First, one line of access control rule of the ACL shown in FIG. 6 is read (Step A1 in FIG. 2). The already-existing rule judgment unit 11 judges that the read rule is not included in the rule stored in the temporary storage unit 15 (Step A2 in FIG. 2) and supplies the rule to the first rule judgment unit 12. The first rule judgment unit 12 judges whether the rule is the permission rule (Step A3 in FIG. 2). Then, yamada:/var/samba/pub:read+ and yamada:/var/samba/pub:wirte+, which are the permission rules, are stored in the permission rule storage unit 16 (Step A5 in FIG. 2) and yamada:/var/samba/pub:execute–, which is the prohibition rule, is supplied to the second rule judgment unit 13.

The second rule judgment unit 13 stores the supplied rule in the prohibition rule storage unit 17 since the accessing actor user of the supplied rule is the same as that of the permission rule stored in the permission rule storage unit 16 and the access target resource of the supplied rule does not include the access target resource described in the permission rule which is stored in the permission rule storage unit 16, that is, the access target resource of the supplied rule is not contrary to the access target resource described in the permission rule (Steps A4 and A8 in FIG. 2).

Then, it is judged whether the rule is the last rule (Step A9 in FIG. 2). Since the input ACL does not reach the last line, the access control rule in the second line is read (Step A1 in FIG. 2). The already-existing rule judgment unit 11 judges that the read rule is not included in the rule stored in the temporary storage unit 15 (Step A2 in FIG. 2). Therefore, the rule is supplied to the first rule judgment unit 12 and the first rule judgment unit 12 judges whether the rule is the permission rule (Step A3 in FIG. 2).

Then, yamada:/var/samba/keiri:read+ and yamada:/var/samba/keiri:wirte+, which are the permission rules, are stored in the permission rule storage unit 16 (Step A5 in FIG. 2) and yamada:/var/samba/keiri:execute–, which is the prohibition rule, is supplied to the second rule judgment unit 13.

The second rule judgment unit 13 judges that the supplied rule is not contrary to the permission rule stored in the permission rule storage unit 16. Therefore, the rule is stored in the prohibition rule storage unit 17 Steps A4 and A8 in FIG. 2). Then, it is judged whether the rule is the last rule (Step A9 in FIG. 2). Since the input ACL does not reach the last line, the access control rule in the third line is read (Step A1 in FIG. 2). The already-existing rule judgment unit 11 judges that the read rule is not included in the rule stored in the temporary storage unit 15 (Step A2 in FIG. 2). Therefore, the rule is supplied to the first rule judgment unit 12 and the first rule judgment unit 12 judges whether the rule is the permission rule. Since the rule is judged to be the prohibition rule, it is supplied to the second rule judgment unit 13 (Step A3 in FIG. 2).

The second rule judgment unit 13 judges that the supplied rule "yamada:/var/samba/:execute–" is not contrary to the permission rule stored in the permission rule storage unit 16 and the rule is stored in the prohibition rule storage unit 17 (Steps A4 and A8 in FIG. 2). Since yamada:/var/samba/: read– and yamada:/var/samba/:write– are contrary to yamada:/var/samba/pub:read+, yamada:/var/samba/pub: wirte+, yamada:/var/samba/keiri:read+, and yamada:/var/samba/keiri:wirte+ stored in the permission rule storage unit 16, they are supplied to the resource expansion unit 14**.

When yamada:/var/samba/:read– is supplied, the resource expansion unit 14 recognizes that there are pub, keiri, and soumu under /var/samba/ with reference to the resource DB 106 and expands the resources such that resource information of the same hierarchy as that having yamada:/var/samba/pub:read+ and yamada:/var/samba/keiri:read+ stored in the permission rule storage unit 16 can be represented (Step A6 in FIG. 2**), thereby obtaining yamada:/var/samaba/pub:read–, yamada:/var/samba/keiri:read–, yamada:/var/samba/soumu:read–, and yamada:/var/samba/*:read–. Then, the resource expansion unit 14 removes hear/samba/pub and /var/samba/keiri, which are the access target resources stored in the permission rule storage unit 16, from the obtained rules and stores yamada:/var/samba/soumu:read– and yamada:/var/samba/*:read– in the prohibition rule storage unit 17 (Steps A7 and A8 in FIG. 2). Then the resource expansion unit 14 performs the same process as described above on the supplied rule "yamada:/var/samba/**:wirte–" and stores yamada:/var/samba/soumu: wirte– and yamada:/var/samba/*:wirte– in the prohibition rule storage unit 17 (Steps A4, A6, A7, and A8 in FIG. 2).

Since the input ACL reaches the last line, yamada:/var/samba/pub:execute–, yamada:/var/samba/keiri:execute–, yamada:/var/samba/soumu:read–,wirte–, and yamada:/var/samba/*:read–,wirte– stored in the prohibition rule storage unit 17 are output. In this way, an ACL of a black list format is obtained.

Since a default rule is permitted in the black list, the ACL shown in FIG. 8 in which the access right that is not described in the output access target resource is permitted is obtained as an output. In the ACL obtained as the output, there is no restriction in the order in which the access control rules are described. Therefore, even when the access control rules are arbitrarily interchanged and the access control mechanism does not process the rules in descending order, it is possible to obtain the same access control effect as described above when access to all of the access control rules described in the ACL is controlled.

Finally, the distribution unit 105 distributes the ACL output from the ACL conversion unit 101 to the control target machines 200-*n* and issues a setting instruction. As a method for transmitting/setting the ACL, any communication protocol, such as telnet or ssh, may be used, or the communication protocol shown in FIG. 9 may be used.

First, the integrated access control server 100 that distributes the ACL inquires of the control target machines 200-*n* whether to prepare setting (Step B1 in FIG. 9) using the distribution unit 105 and acquires information indicating whether the setting units 201 of the control target machines 200-*n* are valid, information indicating that the receiving units 203 of the control target machines 200-*n* corresponds to which communication protocol as a protocol used to transmit the ACL to be distributed, and information indicating that a main protocol used to transmit the ACL is which protocol (Step B2 in FIG. 9).

In this case, it is preferable that a message be based on SOAP-based WS-Management shown in FIG. 10. In this embodiment, a Get action of WS-Management is used to designate a resource that represents the setting of the setting unit 201 as a resource URI or a resource that represents a corresponding protocol and transmits the message to the receiving units 203 of the control target machine 200-*n* for inquiry. The receiving units 203 of the control target machines 200-*n* respond to the setting preparation inquiry from the distribution unit 105 of the integrated access control server 100 as a Get Response action based on the SOAP based WS-Management.

Then, the distribution unit 105 of the integrated access control server 100 transmits the ACL to the receiving units 203 of the control target machines 200-*n* according to the protocol obtained by the setting preparation inquiry (Step B3 in FIG. 9). The transmission protocol used in this stage depends on the protocol obtained by the setting preparation inquiry in the previous stage and is not particularly designated.

Then, the distribution unit 105 of the integrated access control server 100 uses a Put action of WS-Management in the case of update and uses Delete of WS-Management in the case of deletion on the basis of the SOAP-based WS-Management shown in FIG. 11 to designate a resource representing the setting unit 201 as the resource URI, designate Policy_ID indicating an ACL to be set, and transmit the message to the receiving units 203 of the control target machines 200-*n*, thereby requesting the setting of the ACL (Step B4 in FIG. 9).

When receiving the request, the receiving unit 203 outputs the setting instruction to the setting unit 201 (Step B5 in FIG. 9) and the setting unit 201 responds to the setting instruction (Step B6 in FIG. 9). When receiving the response to the setting instruction, the receiving unit 203 performs a Put Response action or a Delete Response action based on the SOAP-based WS-Management as a response to the ACL setting request, thereby responding to the distribution unit 105 of the integrated access control server 100 (Step B7 in FIG. 9).

Only the ACL shown in FIG. 8 may be distributed from the integrated access control server 100 that distributes an ACL as long as the setting unit 201 provided in the control target machine 200-*n* can process the ACL of the black list format. In this case, since it is not necessary to prepare the ACL for each of the control target machines 200-1, 200-2, . . . , 200-*n*, the number of ACL's that need to be generated by the integrated access control server 100 from the policy to be distributed may be one even though the number of control target machines increases.

Sixth Embodiment

Figure 13:
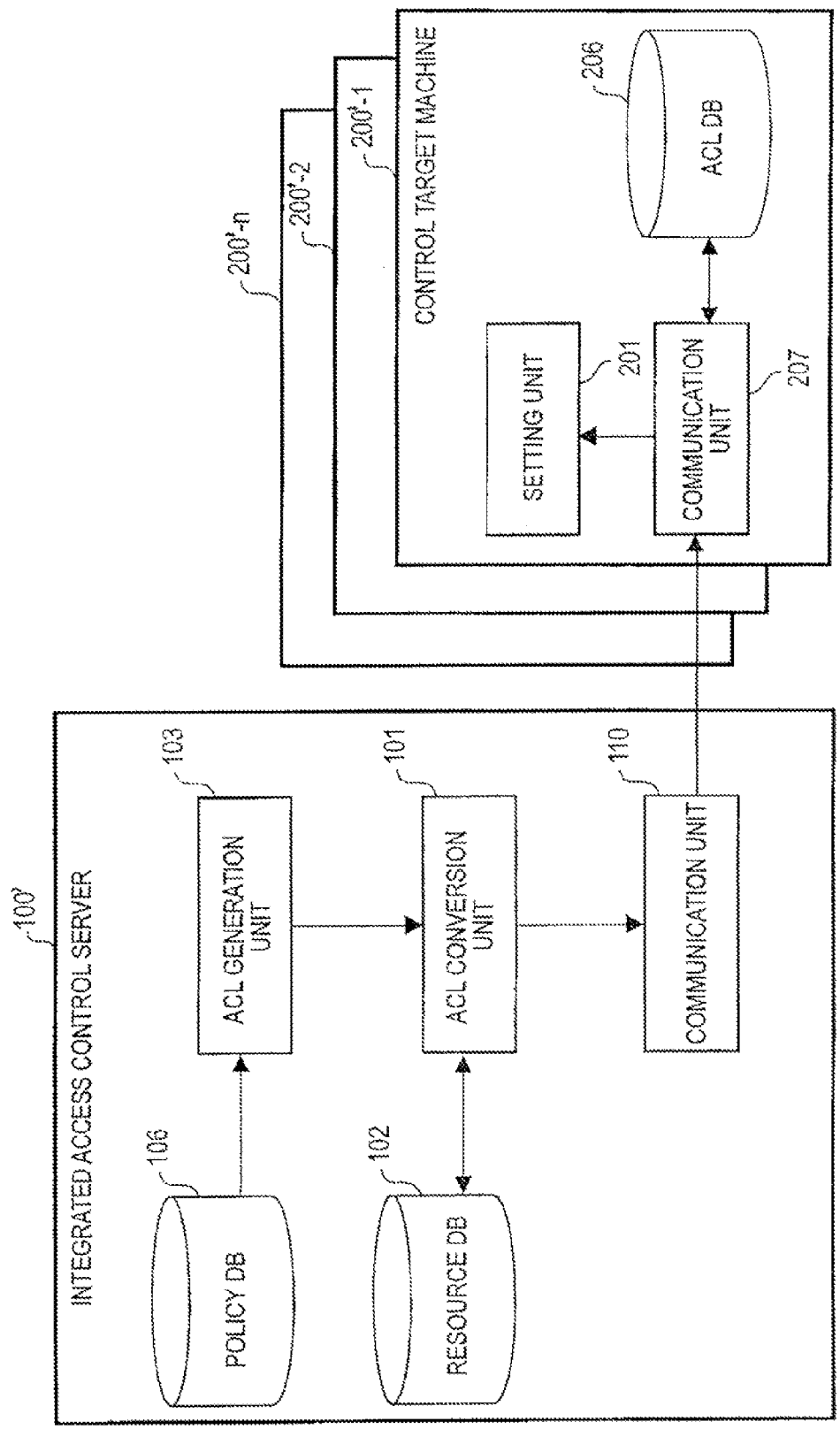
FIG. 13 is a block diagram illustrating an access-control-list-reference-type difference distribution system according to a sixth embodiment of the invention.

A sixth embodiment relates to an example in which an integrated access control server comprehensively manages only a policy for performing access control and a control target machine has a function of acquiring ACL information, thereby performing integrated access control. FIG. 13 is a block diagram illustrating an access-control-list-reference-type difference distribution system according to the sixth embodiment of the invention.

Referring to FIG. 13, this embodiment includes an integrated access control server 100' and a plurality of (n) control target machines 200'-*n*. The integrated access control server 100' includes a policy DB 106, a resource DB 102, an ACL generation unit 103, an ACL conversion unit 101, and a communication unit 110. Each of the control target machines 200'-n includes an ACL DB 206, a setting unit 201, and a receiving unit 207.

In the integrated access control server 100', the policy DB 106 that stores an established policy supplies a policy to be distributed to the ACL generation unit 103 and an ACL is obtained. Then, the ACL is supplied to the ACL conversion unit 101 and an ACL without restriction in the description order is obtained. In addition, the integrated access control server 100' communicates with the communication units 207 of the control target machines 200'-n using the communication unit 110 to acquire the ACL's set or distributed to the control target machines 200'-n and the meta information of the ACL's which are stored in the ACL DB 206.

Among the ACL's that are currently obtained by the ACL conversion unit 101, the difference of or all of the ACL's required to perform the access control established in the policy in the control target machines 200'-n is distributed on the basis of the acquired ACL's and the acquired meta information of the ACL's. For example, when all of the resource information of the control target machines 200'-n is as shown in FIG. 7 and Yamada in the accounting department, in which an access actor is Yamada, changes its department from the accounting department to the general affairs department due to personnel reshuffling, the policy applied to Yamada is changed and the access control list of the access actor "Yamada" is changed.

In this case, the ACL shown in FIG. 8 is currently set to the control target machines 200'-n and the ACL shown in FIG. 14 is obtained from a policy that is newly applied to yamda through the ACL conversion unit 101.

The integrated access control server 100' acquires the version of the ACL or the hash value of the ACL as the meta information of the ACL that is currently set to the control target machines 200'-n using the communication unit 110. In this way, it is possible to know that the ACL to be set is different from the currently set ACL. The integrated access control server 100' thus refers to the ACL that is currently set to the control target machines 200'-n, instructs to delete the ACL shown in FIG. 15 that is a difference between the currently set ACL and the ACL that is currently generated and converted, and instructs to add the ACL shown in FIG. 16.

When the distribution of the ACL to the control target machines 200'-n ends, the integrated access control server 100' instructs the setting units 201 of the control target machines 200'-n to set the ACL through the communication unit 110 and the communication units 207.

The communication unit 110 of the integrated access control server 100' and the communication units 207 of the control target machines 200'-n may use any communication protocol, such as HTTP or Telnet. However, a protocol based on WS-Management is preferable. The policy distribution/setting protocol is as shown in FIG. 9 and a description thereof will not be repeated in this embodiment. In this embodiment, when acquiring information stored in the ACL DB 206 of each of the control target machines 200'-n, the integrated access control server 100' uses an Enumerate action based on WS-Management shown in FIG. 17 to designate ACL's on the control target machines 200'-n as a resource URI and inquires the ACL's of the communication units 207 of the control target machines 200'-n. A list of all of the ACL's on the control target machines 200'-n responds to the communication unit 110 of the integrated access control server 100' as an Enumerate Response action of WS-Management.

The integrated access control server 100' checks whether there is an old version of the ACL to be distributed in the obtained list. When there is no old version, the integrated access control server 100' proceeds to an ACL distribution phase. When there is an old version, the integrated access control server 100' acquires the ACL or the meta information of the ACL.

When the meta information of the ACL is acquired, the integrated access control server 100' searches for the instance of the corresponding ACL from the list which is obtained by the Enumerate action, designates the ACL's on the control target machines 200'-n to the resource URI using the Get action based on WS-Management shown in FIG. 18, designates the instance of the ACL using SeleotorSet, and inquires the ACL's of the communication units 207 of the control target machines 200'-n. Then, the meta information of the ACL is transmitted as a response to the communication unit 110 of the integrated access control server 100'.

When the ACL is acquired, the integrated access control server 100' inquires the type of communication protocol as a file transmission protocol corresponding to the control target machines 200'-n, similarly to the policy distribution/setting protocol, determines a transmission protocol for transmitting the ACL, and acquires the ACL.

The access control list conversion system according to each of the above-described embodiments of the invention may also be implemented by hardware. In addition, a computer may read a program for allowing the computer to function as a search system from a computer-readable recording medium and execute the program, thereby implementing the access control list conversion system.

An access control list conversion method according to the above-described embodiments of the invention may also be implemented by hardware. In addition, a computer may read a program for performing the method from a computer-readable recording medium and execute the program, thereby implementing the access control list conversion method.

The exemplary embodiments of the invention have been described above, but various modifications and changes of the invention can be made in the range of the claims, without departing from the spirit and main characteristics of the invention. Therefore, the above-described embodiments of the invention are just illustrative, but do not limit the technical scope of the invention. The range of the invention is defined by the appended claims and is not limited to the specification or the abstract. In addition, all of the modifications or changes in the ranges equivalent to the claims are included in the scope of the invention.

This application claims priority based on Japanese Patent Application No. 2009-068002 filed Mar. 19, 2009 the content of which is incorporated hereinto by reference.

INDUSTRIAL APPLICABILITY

The invention can be applied to know the intention of a person who changes a policy represented as an access control list or to distribute a difference while guaranteeing the consistency of a changed portion. In addition, the invention can be applied to newly generate or change an access control list, in order to generates the access control list for a plurality of access control execution mechanisms or reflect a change in the access control list to the plurality of access control execution mechanisms.

REFERENCE SIGNS LIST

11: already-existing rule judgment unit
12: first rule judgment unit
13: second rule judgment unit 14: resource expansion unit
15: temporary storage unit
16: permission rule storage unit
17: prohibition rule storage unit
100, 100', 100": integrated access control server
101: ACL conversion unit
102: resource DB
103: ACL generation unit
104, 104': difference extraction unit
105: distribution unit
106: policy DB
107: ACL DB
108: signature unit
109: ACL inquiry
110: communication unit
200, 200-1, 200-2, 200-n: control target machine
200', 200'-1, 200'-2, 200'-n: control target machine
200": control target machine
201: setting unit
202: merging unit
203: receiving unit
204: signature verifying unit
205: ACL control unit
206: ACL DB
207: communication unit

The invention claimed is:

1. An access control list conversion system comprising: hardware, including a processor; a reading unit implemented at least by the hardware and configured to be supplied with an access control list including at least one access control rule and to read the access control rule described in the access control list, the access control rule being a set of an access target resource to be accessed, an accessing actor user who accesses the access target resource, and an access right, the access right defining whether to permit or prohibit the access of the accessing actor user to the access target resource; a first rule judgment unit implemented at least by the hardware and configured to judge whether the read access control rule is a permission rule or a prohibition rule, the permission rule permitting the access of the accessing actor user to the access target resource, the prohibition rule prohibiting the access of the accessing actor user to the access target resource; a storage unit implemented at least by the hardware and configured to store the access control rule which is judged to be the permission rule by the first rule judgment unit; a second rule judgment unit implemented at least by the hardware and configured to judge whether the accessing actor user of the access control rule which is judged to be the prohibition rule is the same as the accessing actor user of the access control rule stored in the storage unit and whether the access target resource of the access control rule which is judged to be the prohibition rule includes the access target resource of the access control rule stored in the storage unit; a database implemented at least by the hardware and configured to store resource information in which all of the latest information of the access target resource is systematically recorded from a superordinate concept to a subordinate concept; and a resource expansion unit implemented at least by the hardware and configured to remove, with reference to the resource information, the access target resource described in the access control rule which is stored in the storage unit from the access target resource of the access control rule which is judged to be the prohibition rule, in the case where the second rule judgment unit judges that the accessing actor user of the access control rule which is judged to be the prohibition rule is the same as the accessing actor user of the access control rule stored in the storage unit and that the access target resource of the access control rule which is judged to be the prohibition rule includes the access target resource of the access control rule stored in the storage unit.

2. The access control list conversion system according to claim 1, wherein the resource expansion unit is configured to expand the access target resource of the access control rule which is judged to be the prohibition rule, to the same level of the subordinate concept as that of the access target resource of the access control rule stored in the storage unit with reference to the resource information, and to remove the access target resource of the access control rule stored in the storage unit from the access target resource which is expanded to the same level of the subordinate concept.

3. The access control list conversion system according to claim 1, wherein the storage unit includes: a permission rule storage unit configured to store the access control rule which is judged to be the permission rule by the first rule judgment unit; and a prohibition rule storage unit configured to store first to third access control rules, the first access control rule being the access control rule which is judged to be the prohibition rule by the first rule judgment unit, the second access control rule which is being an access control rule that the second rule judgment unit judges that the accessing actor user of the access control rule which is judged to be the prohibition rule is different from the accessing actor user of the access control rule stored in the storage unit, or that the access target resource of the access control rule which is judged to be the prohibition rule doesn't include the access target resource of the access control rule stored in the storage unit, the third access control rule being an access control rule from which the access target resource described in the access control rule stored in the storage unit is removed by the resource expansion unit, and the access control rules stored in the prohibition rule storage unit are finally output.

4. The access control list conversion system according to claim 1, wherein, when the reading unit refers to the storage unit and the read access control rule is included in the access control rule stored in the storage unit, the reading unit configured to read a new access control rule from the access control list.

5. An access control list conversion system comprising: hardware, including a processor; a reading unit implemented at least by the hardware and configured to be supplied with an access control list including at least one access control rule and to read the access control rule described in the access control list, the access control rule being a set of an access target resource to be accessed, an accessing actor user who accesses the access target resource, and an access right, the access right defining whether to permit or prohibit the access of the accessing actor user to the access target resource; a first rule judgment unit implemented at least by the hardware and configured to judge whether the read access control rule is a permission rule or a prohibition rule, the permission rule permitting the access of the accessing actor user to the access target resource, the prohibition rule prohibiting the access of the accessing actor user to the access target resource; a storage unit implemented at least by the hardware and configured to store the access control rule which is judged to be the prohibition rule by the first rule judgment unit; a second rule judgment unit implemented at least by the hardware and configured to judge whether the accessing actor user of the access control rule which is judged to be the permission rule is the same as the accessing actor user of the access control rule stored in the storage unit and whether the access target resource of the access control rule which is judged to be the permission rule includes the access target resource of the access control rule stored in the storage unit; a database implemented at least by the hardware and configured to judge resource information in which all of the latest information of the access target resource is systematically recorded from a superordinate concept to a subordinate concept; and a resource expansion unit implemented at least by the hardware and configured to remove, with reference to the resource information, the access target resource described in the access control rule which is stored in the storage unit from the access target resource of the access control rule which is judged to be the permission rule, in the case where the second rule judgment unit judges that the accessing actor user of the access control rule which is judged to be the permission rule is the same as the accessing actor user of the access control rule stored in the storage unit and that the access target resource of the access control rule which is judged to be the permission rule includes the access target resource of the access control rule stored in the storage unit.

6. The access control list conversion system according to claim 5,
wherein the resource expansion unit is configured to expand the access target resource of the access control rule which is judged to be the permission rule, to the same level of the subordinate concept as that of the access target resource of the access control rule stored in the storage unit with reference to the resource information, and removes the access target resource of the access control rule stored in the storage unit from the access target resource which is expanded to the same level of the subordinate concept.

7. The access control list conversion system according to claim 5, wherein the storage unit includes: a prohibition rule storage unit configured to store the access control rule which is judged to be the prohibition rule by the first rule judgment unit; and a permission rule storage unit configured to store first to third access control rules, the first access control rule being the access control rule which is judged to be the permission rule by the first rule judgment unit, the second access control rule which is being an access control rule that the second rule judgment unit judges that the accessing actor user of the access control rule which is judged to be the permission rule is different from the accessing actor user of the access control rule stored in the storage unit, or that the access target resource of the access control rule which is judged to be the permission rule doesn't include the access target resource of the access control rule stored in the storage unit, the third access control rule being an access control rule from which the access target resource described in the access control rule stored in the storage unit is removed by the resource expansion unit, and the access control rules stored in the permission rule storage unit are finally output.

8. The access control list conversion system according to claim 5, wherein, when the reading unit refers to the storage unit and the read access control rule is included in the access control rule stored in the storage unit, the reading unit configured to read a new access control rule from the access control list.

9. An access control list conversion method comprising:
reading step of receiving an access control list including at least one access control rule, and reading the access control rule described in the access control list, the access control rule being a set of an access target resource to be accessed, an accessing actor user who accesses the access target resource, and an access right, the access right defining whether to permit or prohibit the access of the accessing actor user to the access target resource;
a first rule judging step of judging whether the read access control rule is a permission rule or a prohibition rule, the permission rule permitting the access of the accessing actor user to the access target resource, the prohibition rule prohibiting the access of the accessing actor user to the access target resource;
a storage step of storing the access control rule which is judged to be the permission rule in the first rule judging step;
a second rule judging step of judging whether the accessing actor user of the access control rule which is judged to be the prohibition rule is the same as the accessing actor user of the access control rule stored in the storage step and whether the access target resource of the access control rule which is judged to be the prohibition rule includes the access target resource of the access control rule stored in the storage step; and
a resource expansion step of storing resource information in which all of the latest information of the access target resource is systematically recorded from a superordinate concept to a subordinate concept in a database, and removing, with reference to the resource information, the access target resource described in the access control rule which is stored in the storage step from the access target resource of the access control rule which is judged to be the prohibition rule, in the case where in the judgment of the second rule judgment step, the accessing actor user of the access control rule which is judged to be the prohibition rule is the same as the accessing actor user of the access control rule stored in the storage step and the access target resource of the access control rule which is judged to be the prohibition rule includes the access target resource of the access control rule stored in the storage step.

10. The access control list conversion method according to claim 9,
wherein the resource expansion step expands the access target resource of the access control rule which is judged to be the prohibition rule, to the same level of the subordinate concept as that of the access target resource of the access control rule stored in the storage step with reference to the resource information, and removes the access target resource of the access control rule stored in the storage step from the access target resource which is expanded to the same level of the subordinate concept.

11. The access control list conversion method according to claim 9, wherein the storage step includes: a permission rule storage step of storing the access control rule which is judged to be the permission rule in the first rule judging step; and a prohibition rule storage step of storing first to third access control rules, the first access control rule being the access control rule which is judged to be the prohibition rule in the first rule judging step, the second access control rule being an access control rule which in the judgment of the second rule judging step, the accessing actor user of the access control rule which is judged to be the prohibition rule is different from the accessing actor user of the access control rule stored in the storage step, or that the access target resource of the access control rule which is judged to be the prohibition rule doesn't include the access target resource of the access control rule stored in the storage step, the third access control rule being an access control rule from which the access target resource described in the access control rule stored in the storage step is removed in the resource expansion step, and the access control rules stored in the prohibition rule storage step are finally output.

12. The access control list conversion method according to claim 9, wherein, when the reading step refers to the access control rule stored in the storage step and the read access control rule is included in the access control rule stored in the storage step, the reading step reads a new access control rule from the access control list.

13. An access control list conversion method comprising:
   a reading step of receiving an access control list including at least one access control rule, and reading the access control rule described in the access control list, the access control rule being a set of an access target resource to be accessed, an accessing actor user who accesses the access target resource, and an access right, the access right defining whether to permit or prohibit the access of the accessing actor user to the access target resource;
   a first rule judging step of judging whether the read access control rule is a permission rule or a prohibition rule, the permission rule permitting the access of the accessing actor user to the access target resource, the prohibition rule prohibiting the access of the accessing actor user to the access target resource;
   a storage step of storing the access control rule which is judged to be the prohibition rule in the first rule judging step;
   a second rule judging step of judging whether the accessing actor user of the access control rule which is judged to be the permission rule is the same as the accessing actor user of the access control rule stored in the storage step and whether the access target resource of the access control rule which is judged to be the permission rule includes the access target resource of the access control rule stored in the storage step; and
   a resource expansion step of storing resource information in which all of the latest information of the access target resource is systematically recorded from a superordinate concept to a subordinate concept in a database, and removing, with reference to the resource information, the access target resource described in the access control rule which is stored in the storage step from the access target resource of the access control rule which is judged to be the permission rule, in the case where in the judgment of the second rule judgment step, the accessing actor user of the access control rule which is judged to be the permission rule is the same as the accessing actor user of the access control rule stored in the storage step and the access target resource of the access control rule which is judged to be the permission rule includes the access target resource of the access control rule stored in the storage step.

14. The access control list conversion method according to claim 13,
   wherein the resource expansion step expands the access target resource of the access control rule which is judged to be the permission rule, to the same level of the subordinate concept as that of the access target resource of the access control rule stored in the storage step with reference to the resource information, and removes the access target resource of the access control rule stored in the storage step from the access target resource which is expanded to the same level of the subordinate concept.

15. The access control list conversion method according to claim 13, wherein the storage step includes:
   a prohibition rule storage step of storing the access control rule which is judged to be the prohibition rule in the first rule judging step; and a permission rule storage step of storing first to third access control rules, the first access control rule being the access control rule which is judged to be the permission rule in the first rule judging step, the second access control rule being an access control rule which in the judgment of the second rule judging step, the accessing actor user of the access control rule which is judged to be the permission rule is different from the accessing actor user of the access control rule stored in the storage step, or that the access target resource of the access control rule which is judged to be the permission rule doesn't include the access target resource of the access control rule stored in the storage step, the third access control rule being an access control rule from which the access target resource described in the access control rule stored in the storage step is removed in the resource expansion step, and the access control rules stored in the permission rule storage step are finally output.

16. The access control list conversion method according to claim 13, wherein, when the reading step refers to the access control rule stored in the storage step and the read access control rule is included in the access control rule stored in the storage step, the reading step reads a new access control rule from the access control list.

17. A non-transitory computer-readable recording medium storing an access control list conversion program that allows a computer to perform:
   processing of receiving an access control list including at least one access control rule, the access control rule being a set of an access target resource to be accessed, an accessing actor user who accesses the access target resource, and an access right, the access right defining whether to permit or prohibit the access of the accessing actor user to the access target resource;
   reading processing of reading the access control rule described in the access control list;
   first rule judging processing of judging whether the read access control rule is a permission rule or a prohibition rule, the permission rule permitting the access of the accessing actor user to the access target resource, the prohibition rule prohibiting the access of the accessing actor user to the access target resource;
   storage processing of storing the access control rule which is judged to be the permission rule in the first rule judging processing;
   second rule judging processing of judging whether the accessing actor user of the access control rule which is judged to be the prohibition rule is the same as the accessing actor user of the access control rule stored in the storage processing and whether the access target resource of the access control rule which is judged to be the prohibition rule includes the access target resource of the access control rule stored in the storage processing;
   processing of storing resource information in which all of the latest information of the access target resource is systematically recorded from a superordinate concept to a subordinate concept in a database; and
   resource expansion processing of removing, with reference to the resource information, the access target resource described in the access control rule which is stored in the storage processing from the access target resource of the access control rule which is judged to be the prohibition rule, in the case where in the judgment of the second rule judgment processing, the accessing actor user of the access control rule which is judged to be the prohibition rule is the same as the accessing actor user of the access control rule stored in the storage processing and the access target resource of the access control rule which is judged to be the prohibition rule includes the access target resource of the access control rule stored in the storage processing.

18. The non-transitory computer-readable recording medium according to claim 17,
wherein the resource expansion processing expands the access target resource of the access control rule which is judged to be the prohibition rule, to the same level of the subordinate concept as that of the access target resource of the access control rule stored in the storage processing with reference to the resource information, and removes the access target resource of the access control rule stored in the storage processing from the access target resource which is expanded to the same level of the subordinate concept.

19. The non-transitory computer-readable recording medium according to claim 17,
wherein the storage processing includes:
permission rule storage processing of storing the access control rule which is judged to be the permission rule in the first rule judging processing;
prohibition rule storage processing of storing first to third access control rules, the first access control rule being the access control rule which is judged to be the prohibition rule in the first rule judging processing, the second access control rule being an access control rule which in the judgment of the second rule judging processing, the accessing actor user of the access control rule which is judged to be the prohibition rule is different from the accessing actor user of the access control rule stored in the storage processing, or that the access target resource of the access control rule which is judged to be the prohibition rule doesn't include the access target resource of the access control rule stored in the storage processing, the third access control rule being an access control rule from which the access target resource described in the access control rule stored in the storage processing is removed in the resource expansion processing, and
the access control rules stored in the prohibition rule storage processing are finally output.

20. The non-transitory computer-readable recording medium according to claim 17,
wherein, when the reading processing refers to the access control rule stored in the storage processing and the read access control rule is included in the access control rule stored in the storage processing, the reading processing reads a new access control rule from the access control list.

21. A non-transitory computer-readable recording medium storing an access control list conversion program that allows a computer to perform:
processing of receiving an access control list including at least one access control rule, the access control rule being a set of an access target resource to be accessed, an accessing actor user who accesses the access target resource, and an access right, the access right defining whether to permit or prohibit the access of the accessing actor user to the access target resource;
reading processing of reading the access control rule described in the access control list;
first rule judging processing of judging whether the read access control rule is a permission rule or a prohibition rule, the permission rule permitting the access of the accessing actor user to the access target resource, the prohibition rule prohibiting the access of the accessing actor user to the access target resource;
storage processing of storing the access control rule which is judged to be the prohibition rule in the first rule judging processing;
second rule judging processing of judging whether the accessing actor user of the access control rule which is judged to be the permission rule is the same as the accessing actor user of the access control rule stored in the storage processing and whether the access target resource of the access control rule which is judged to be the permission rule includes the access target resource of the access control rule stored in the storage processing;
processing of storing resource information in which all of the latest information of the access target resource is systematically recorded from a superordinate concept to a subordinate concept in a database; and
resource expansion processing of removing, with reference to the resource information, the access target resource described in the access control rule which is stored in the storage processing from the access target resource of the access control rule which is judged to be the permission rule, in the case where in the judgment of the second rule judgment processing, the accessing actor user of the access control rule which is judged to be the permission rule is the same as the accessing actor user of the access control rule stored in the storage processing and the access target resource of the access control rule which is judged to be the permission rule includes the access target resource of the access control rule stored in the storage processing.

22. The non-transitory computer-readable recording medium according to claim 21,
wherein the resource expansion processing expands the access target resource of the access control rule which is judged to be the permission rule, to the same level of the subordinate concept as that of the access target resource of the access control rule stored in the storage processing with reference to the resource information, and removes the access target resource of the access control rule stored in the storage processing from the access target resource which is expanded to the same level of the subordinate concept.

23. The non-transitory computer-readable recording medium according to claim 21,
wherein the storage processing includes:
prohibition rule storage processing of storing the access control rule which is judged to be the prohibition rule in the first rule judging processing; and
permission rule storage processing of storing first to third access control rules, the first access control rule being the access control rule which is judged to be the permission rule in the first rule judging processing, the second access control rule being an access control rule which in the second rule judging processing, the accessing actor user of the access control rule which is judged to be the permission rule is different from the accessing actor user of the access control rule stored in the storage processing, or that the access target resource of the access control rule which is judged to be the permission rule doesn't include the access target resource of the access control rule stored in the storage processing, the third access control rule being an access control rule from which the access target resource described in the access control rule stored in the storage processing is removed in the resource expansion processing, and the access control rules stored in the permission rule storage processing are finally output.

24. The non-transitory computer-readable recording medium according to claim 21, wherein, when the reading processing refers to the access control rule stored in the storage processing and the read access control rule is included in the access control rule stored in the storage processing, the reading processing reads a new access control rule from the access control list.

* * * * *